United States Patent [19]

Montagnon

[11] 4,166,037

[45] Aug. 28, 1979

[54] ACTIVATED CARBON FILTER HAVING PLURAL LAYERS

[75] Inventor: Jean R. Montagnon, La Celle St. Cloud, France

[73] Assignee: Societe Pica, Levallois Perret, France

[21] Appl. No.: 853,769

[22] Filed: Nov. 21, 1977

Related U.S. Application Data

[63] Continuation of Ser. No. 690,269, May 26, 1976, abandoned.

[30] Foreign Application Priority Data

May 30, 1975 [FR] France .................................. 75 16931

[51] Int. Cl.² ............................................ B01D 23/14
[52] U.S. Cl. ..................................... 210/275; 210/290
[58] Field of Search ....................... 210/35, 39, 40, 82, 210/263, 290, 80, 275

[56] References Cited

U.S. PATENT DOCUMENTS

| | | | |
|---|---|---|---|
| 293,745 | 2/1884 | Hyatt | 210/290 |
| 2,057,237 | 10/1936 | Hoop | 210/290 |
| 3,814,247 | 6/1974 | Hirs | 210/290 |
| 3,876,546 | 4/1975 | Hsiung et al. | 210/290 |

*Primary Examiner*—Charles N. Hart
*Assistant Examiner*—Ivars Cintins
*Attorney, Agent, or Firm*—Darby & Darby

[57] ABSTRACT

An adsorbtion filter for water including a housing containing a plurality of layers of granules of different types of activated carbon material with the carbon material of a respective layer having substantially the same mesh size, apparent density and adsorbtive capacity, the layers being juxtaposed and the materials of the respective layers having decreasing internal pore size and increasing indices of retentivity proceeding in a direction from the inlet to the outlet of the filter.

5 Claims, No Drawings

ACTIVATED CARBON FILTER HAVING PLURAL LAYERS

This application is a continuation of my prior copending application, Ser. No. 690,269 filed May 26, 1976, which application is now abandoned.

The object of the present invention is an improvement in devices for filtering and regenerating polluted water operating with granulated active carbon.

Generally, in a station for purifying water, a primary sterilisation is first of all carried out with chlorine and chlorine dioxide, then the water is conducted to clarification tanks where coagulating agents are added to the water, which retain a certain number of physical impurities in suspension in the water, which stick together in masses called "flock" and settle by decantation at the bottom of the said clarification tanks; the water is then filtered through a sand filter so as to hold back the last traces of flock and of sediment.

This sand filter is cleaned periodically by washing, the washing water being conveyed through the filter in counter current at a speed sufficiently high to fluidize the whole of the mass of sand.

It has been proposed to replace the sand filters by active carbon filters, which then not only play the role of mechanical filtration of the sand filters but also the adsorbant role of the active carbon filters as regards dissolved chemical substances.

Like the sand filters, the granulated carbon filters have to be scoured and washed periodically in counter current so as to eliminate the retained physical impurities (dirt, flock in suspension . . . ). This periodicity generally amounts to days although the adsorbing power of the active carbon as regards dissolved substances becomes saturated progressively in a much longer time, the exhaustion of the adsorbing capacity taking place generally after many months, if not some years.

The adsorbing power of the active carbon as regards dissolved chemical substances varies in accordance with the molecular dimensions of the latter; in particular, it is a function of the dimension of the pores of the carbon with regard to substances to be adsorbed.

It is known that when an active carbon bed is completely saturated with a pollutant of low molecular dimensions, it can still adsorb another pollutant having much larger molecules, the second pollutant forcing the first out of the active carbon and being retained in its place.

On the other hand, it is known that according to the vegetable materials or mineral materials from which they are derived, and according to the activation processes employed, the active carbons may have very different adsorption characteristics for the same granulometry, these differences arising essentially, for the same total surface, from the dimensions of the pores hollowed out of the carbon by the activation process.

So as to obtain a filter having the best possible qualities for the filtration of water, while being easy to maintain by a counter current washing, there are arranged according to the present invention, in one and the same enclosure, a plurality of superposed layers of different granulated active carbons, having the same granulometry, but having from layer to layer towards the bottom: increasing densities; decreasing dimensions of pores, increasing indices of retentivity.

In fact, the work of the applicants on five different active carbons of the same granulometry has enabled the following table to be drawn up:

TABLE I

| | Apparent Density g/cm³ | Iodine Index (maximum adsorption capacity in weight (%) | Molasses Factor (Weight necessary for a given discolouration) | CCL4 Index maximum adsorption capacity in weight %) | CCL4 retentivity (% retained on desorption) |
|---|---|---|---|---|---|
| Carbon A (based on coconuts) very high density | 0.52 | 140% | 1,000 | 60% | 38% |
| Carbon B (mineral origin) | 0.59 | 77% | 1,200 | 45% | 10% |
| Carbon C heavy vegetable | 0.38 | 165% | 400 | 90% | 32% |
| Carbon D (hard wood) | 0.30 | 119% | 1,100 | 60% | 24% |
| Carbon E (soft wood) | 0.24 | 110% | 200 | 100% | 7% |

This table, given by way of non-limiting example, well illustrates the differences which appear between the current active carbons of good quality which can be used for the purification of water.

However, since specific indices no longer exist normalized for the measure of the quality of active carbons as regards the types of pollutants to be eliminated from water, this table was produced by using the current tests which for the man of the art well characterize the nature and the development of the microporous structure of carbon and which enable its adsorption capacity and its retentivity to be characterized with a good approximation at one and the same time.

It is also to be noted, that one and the same carbon may be activated to different degrees and thus present increasing adsorption capacities as regards certain solutes as a function of those degrees of activation.

Generally, one and the same type of granulated active carbon is lighter the more it is activated but from one type of carbon to the other the same index of iodine activity is not generally accompanied by one and the same carbon tetrachloride index or molasses index. This is due to the nature and the distribution of the internal adsorbant surface; macropores and micropores. The pores of a dimension greater than 50 angstroms are very favourable to the adsorption of the colouring matters in molasses although the pores of a dimension less than 20 angstroms are not very accessible to them; on the other hand, these pores of a dimension less than 20 angstroms are very accessible and very retentive as regards light substances of smaller molecular dimensions, such as benzine, iodine and carbon tetrachloride.

In table I:
  the iodine index represents the adsorption capacity at saturation as regards iodine in solution, this index being expressed as a percentage of the weight of carbon,
  the carbon tetrachloride (CCL4) index is defined in a similar fashion in the gaseous phase, the molasses factor represents the quantity of carbon necessary to obtain the same decolouration effect on a solution of standard molasses as 200 milligrammes of standard carbon. Thus, a carbon is more decolouring the lower its molasses factor.

the retentivity represents the quantity in percent of adsorbed material which the carbon is capable of retaining after saturation when it is subjected to a prolonged dynamic desorption effect (in this respect, counter current washing only produces a very slight desorption having regard to its short duration).

In the course of normal filtration, the current of water itself acts as an extractor when it follows a previously very polluted current.

On the other hand, certain solutes can displace others after a certain degree of carbon charge.

It can be seen, on examining table I, that if it is desired to adsorb the maximum of solutes of very large molecular dimensions, carbon E will be the more indicated; on the other hand its retentivity will be low, particularly as regards light substances. On the contrary, a carbon such as A will be scarcely accessible to solutes of large molecular dimensions, since its adsorption capacity for dissolved heavy colouring matters is only a fifth of that of E, but its retentivity as regards light substances will on the other hand be about five times that of E.

Carbons of types C or D represent intermediate values, but nevertheless with significant differences which can make them of interest. The heavy mineral carbon of type B relatively scarcely active as regards current tests is also not very retentive, as would be the light carbon E which, on the other hand, is endowed with very high adsorbant capacities as regards molasses and carbon tetrachloride. It is of less interest, but it has been cited to show the extent and diversity of the range of active carbons that are encountered in practise.

These various discoveries have caused the applicants to seek to produce a filter comprising a plurality of layers of active carbon in such a manner as to accumulate the advantages of them.

Thus, carbons C and D or E and C or once again C and A or even A, C, D and E may be associated with one another.

However, the problem is posed of counter current washing which, since it fluidizes the beds, produces the risk of completely mixing them up one with the other.

In fact, to clean a filter well, it is shown that it is necessary to proceed with counter current washing of the filter with a current of water strong enough to raise the carbon whilst expanding the bed within the tank; the dirt is then detached from the grains of carbon and being fine and light is entrained by the counter current washing water within the overflow towards the drain. Washing by fluidization of the filter bed which, for current carbons of granulometry of one to two millimeters is effected with rising currents of water having a velocity of the order of 15 to 25 meters an hour, produces an expansion of the filter mass in a volume of liquid representing 1.2 to 1.6 times the volume of the compacted bed; washing being terminated after the supply of counter current water has stopped, the carbon grains once again settle at the bottom of the filter whilst reconstituting a filter bed similar to the original bed, except that the internal layers of carbon are no longer re-established as before and that carbon of the upper layer the adsorption capacity of which may be more or less saturated, may very well be disposed at the bottom of the filter layer where a layer of virgin carbon, or very little charged carbon, should be disposed.

Systematic experiments of counter current washing of filter beds constituted with preceding carbons in an identical granulometry, including between 0.4 and 1.4 millimeters have provided the following results, listed in table II below:

TABLE II

| Velocity in m/h | Expansion in % | | | | |
|---|---|---|---|---|---|
| | Carbon A | Carbon B | Carbon C | Carbon D | Carbon E |
| 10 | 14 | 8 | 27.5 | 35 | 50 |
| 15 | 29 | 17 | 49 | 62 | 82 |
| 20 | 44 | 26 | 71 | 90 | 113 |
| 25 | 59 | 36 | 92 | | |
| 30 | 74 | 45 | | | |

Thus, it can be seen that two carbon layers of the same granulometry having an apparent difference in densities of 25% can be superposed, and by a suitable adjustment of the velocity of counter current washing an expansion of the lower layer of 15% and of the upper layer of 50% can be obtained thus permitting a perfect washing of the two layers without their mixing with one another during the washing nor above all during sedimentation. When the apparent difference in densities of the two layers falls between 15 and 25%, a slight interpenetration of the two layers is observed but this mixing only affects some centimeters of thickness, that is to say less than 10% of the thickness of each layer. The different filtering beds remain practically homogeneous when the difference in density is greater than 25%.

Thus, it is possible to produce a filter bed comprising a plurality of superposed active carbon layers of the same granulometry, but of different quality, characterized in that their apparent densities have a minimum difference of 15%.

These layers will not become mixed during counter-current washing and resettle in an homogeneous manner in the order of increasing apparent densities.

These layers will be advantageously constituted by carbons having adsorbant and complimentary retentive properties judiciously arranged in tiers, for example in the following order from the top to the bottom of the filter:

1. A layer of light carbons with very large pores having an apparent density of 0.25 g/cm3, a molasses factor of the order of 200, an iodine index of 110%, a capacity for adsorption to saturation of carbon tetrachloride of 100%, a retentivity at desorption of carbon tetrachloride of 7%.

2. A layer of less adsorbant carbons as regards large dissolved molecules, but on the other hand having a much higher retentivity as regards light molecules, that is to say carbons such as D or C.

3. Possibly a layer of carbons having high retentivity such as A if carbons D or C are placed in the second position.

Other combinations are possible among which we will remember in particular, always from the top to the bottom, E plus D, or E plus C or C plus A. It is even possible to associate E plus D plus C plus A since the relative differences of the apparent densities are always greater than 20% and since the layers do not remix during the counter current washing phase.

An interesting feature of the invention resides in the fact beyond a difference in apparent density of 20%, two masses of carbons of identical granulometry, previously mixed together are separated when they are subjected to expansion during the counter current washing, and are resettled one upon the other as two distinct homogeneous layers when the rising current of water ceases.

Thus, mixed carbons may be delivered in bulk to the user; it will be sufficient, after having placed them in the vat, to proceed with a counter washing before putting them into service as a filter; this counter washing will have the affect of classifying the active carbons of different densities and of distributing them in ordered layers and tiers in accordance with the principles conforming to the present invention.

Since a high retentivity carbon is very expensive, the present invention enables a relatively thin layer of expensive active carbon to be used whilst still providing a remarkably efficient filter and not being very onerous in its entirety.

In particular, since it is not necessary to provide a separation between the different layers of active carbons, the greater part of the installations operating with sand filters can be transformed without any cost to multi-layer filters in accordance with the present invention.

I claim:

1. In a filter for the purification by adsorption of molecules dissolved in water comprising a housing having a filter media therein, an inlet for the water to be purified, and an outlet for the purified water to exit and through which backwashing liquid is applied, said filter media consisting essentially of a plurality of layers each respectively formed of granules of a different type of activated carbon material which are directly juxtaposed, substantially all of the activated carbon material of a respective layer having substantially the same mesh size, apparent density and adsorptive capacity, and the respective materials forming each layer proceeding in a direction from the inlet to the outlet of the filter having;

decreasing internal pore size and increasing indices of retentivity to retain by adsorption dissolved impurities of successively smaller molecular dimensions going from the filter inlet to outlet and to permit a layer of material more closely adjacent to the filter outlet to retain more fugacious light dissolved impurities not retained or released by desorption by the material of a layer lying more closely adjacent the filter inlet.

2. A filter as in claim 1 wherein there is a difference in apparent densities between the respective materials of adjacent layers in the range of from between about 15% to 25%.

3. A filter as in claim 1 wherein the respective materials forming each layer proceeding in a direction from the inlet to the outlet of the filter also have increasing apparent densities to permit resettling without substantial mixing of the materials of two adjacent layers after backwashing.

4. A filter as in claim 3 wherein the difference in apparent densities between the respective materials of adjacent layers is in the range of from between about 20% to 25%.

5. A filter as in claim 1 wherein the granules of the material are of a size of between about 0.4 and 1.4 mm.

* * * * *